(12) United States Patent
Veerasamy

(10) Patent No.: US 6,365,242 B1
(45) Date of Patent: Apr. 2, 2002

(54) PERIPHERAL SEAL FOR VACUUM IG WINDOW UNIT

(75) Inventor: Vijayen S. Veerasamy, Farmington Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/348,281

(22) Filed: Jul. 7, 1999

(51) Int. Cl.$^7$ .............................. E06B 3/24; E04C 2/54
(52) U.S. Cl. ...................... 428/34; 52/786.1; 52/786.13
(58) Field of Search .......................... 428/34, 192, 120; 52/786.1, 786.13; 156/109

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,303,897 A | 12/1942 | Smith |
| 2,962,409 A | 11/1960 | Ludlow et al. |
| 3,441,924 A | 4/1969 | Peek et al. |
| 3,742,600 A | 7/1973 | Lowell |
| 3,857,161 A | 12/1974 | Hutchins, IV |
| 3,902,883 A | 9/1975 | Bayer |
| 3,912,365 A | 10/1975 | Lowell |
| 3,936,553 A | 2/1976 | Rowe |
| 3,959,577 A | 5/1976 | Frink |
| 3,990,201 A | 11/1976 | Falbel |

(List continued on next page.)

FOREIGN PATENT DOCUMENTS

| | | |
|---|---|---|
| DE | 2520062 | 11/1976 |
| DE | 2951330 | 7/1981 |
| EP | 0047725 | 12/1985 |
| EP | 0489042 | 6/1992 |
| EP | 0645516 | 3/1995 |

(List continued on next page.)

OTHER PUBLICATIONS

Griffiths et al., "Fabrication of Evacuated Glazing at Low Temperature", Solar Energy, vol. 63, pp. 243–249.
PCT International Search Report.
"Thermal Outgassing of Vacuum Glazing" by Lenzen, et. al., School of Physics, Univ. of Sydney, NSW 2006, Australia.
"Temperature–Induced Stresses In Vacuum Glazing: Modelling and Experimental Validation" by Simko, et. al., Solar Energy, vol. 63, No. 1, pp. 1–21, 1998.
"Current Status of the Science and Technology of Vacuum Glazing" by Collins, et. al., Solar Energy, vol. 62, No. 3, pp. 189–213, 1998.
"Fabrication of Evacuated Glazing at Low Temperature" by Griffiths, et. al., Solar Energy, vol. 63, No. 4, pp. 243–249, 1998.
Brochure for "Specialty Solders and Alloys, Technical Information" for Indium Corporation of America.

(List continued on next page.)

Primary Examiner—Donald J. Loney
(74) Attorney, Agent, or Firm—Nixon & Vanderhye P.C.

(57) ABSTRACT

A vacuum insulating glass (IG) unit is provided with an indium inclusive peripheral/edge seal, preferably deposited originally in the form of a viscous slurry. The use of such material for the edge seal permits lower processing temperatures to be used. This in turn may in some embodiments allow thermally tempered glass to be used in IG units without losing substantial temper during the fabrication process, permit certain low-E coatings to be used, and/or allow a lesser number of supporting pillars to be used.

12 Claims, 6 Drawing Sheets

U.S. PATENT DOCUMENTS

| | | |
|---|---|---|
| 4,064,300 A | 12/1977 | Bhangu |
| 4,130,408 A | 12/1978 | Crossland et al. |
| 4,130,452 A | 12/1978 | Indri |
| 4,305,982 A | 12/1981 | Hirsch |
| 4,393,105 A | 7/1983 | Kreisman |
| 4,422,280 A | 12/1983 | Mertin et al. |
| 4,486,482 A | 12/1984 | Kobayashi et al. |
| 4,514,450 A | 4/1985 | Nowobilski et al. |
| 4,542,611 A | 9/1985 | Day |
| 4,586,289 A | 5/1986 | Jaeger |
| 4,598,520 A | 7/1986 | Ellstrom |
| RE32,272 E | 10/1986 | Funaki et al. |
| 4,683,154 A | 7/1987 | Benson et al. |
| 4,780,164 A | 10/1988 | Rueckheim et al. |
| 4,786,344 A | 11/1988 | Beuther |
| 4,822,649 A | 4/1989 | Canaud et al. |
| 4,824,215 A | 4/1989 | Joseph et al. |
| 4,853,264 A | 8/1989 | Vincent et al. |
| 4,865,672 A | 9/1989 | Delbeck et al. |
| 4,874,461 A | 10/1989 | Sato et al. |
| 4,886,095 A | 12/1989 | Lisec |
| 4,909,874 A | 3/1990 | Rueckheim |
| 4,909,875 A | 3/1990 | Canaud et al. |
| 4,924,243 A | 5/1990 | Sato et al. |
| 4,928,448 A | 5/1990 | Phillip |
| 4,983,429 A | 1/1991 | Takayanagi et al. |
| 5,005,557 A | 4/1991 | Bachli |
| 5,017,252 A | 5/1991 | Aldrich et al. |
| 5,027,574 A | 7/1991 | Phillip |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,247,764 A | 9/1993 | Jeshurun et al. |
| 5,270,084 A | 12/1993 | Parker |
| 5,271,973 A | 12/1993 | Huether |
| 5,313,761 A | 5/1994 | Leopold |
| 5,315,797 A | 5/1994 | Glover et al. |
| 5,366,574 A | 11/1994 | Lenhardt et al. |
| 5,399,406 A | 3/1995 | Matsuo et al. |
| 5,489,321 A | 2/1996 | Tracy et al. |
| 5,494,715 A | 2/1996 | Glover |
| 5,499,128 A | 3/1996 | Hasegawa et al. |
| 5,596,891 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,753,069 A | 5/1998 | Rueckheim |
| 5,855,638 A | 1/1999 | Demars |
| 5,891,536 A | 4/1999 | Collins et al. |
| 5,897,927 A | 4/1999 | Tsai et al. |
| 5,902,652 A | 5/1999 | Collins et al. |
| 6,049,370 A | 4/2000 | Smith, Jr. et al. |

FOREIGN PATENT DOCUMENTS

| | | |
|---|---|---|
| EP | 0831073 | 10/1999 |
| FR | 7424197 | 9/1973 |
| FR | 8012696 | 6/1980 |
| FR | 2 482 161 | 11/1981 |
| FR | 2 752 012 | 6/1998 |
| WO | 9700335 | 1/1997 |
| WO | WO 99/47466 | 9/1999 |

OTHER PUBLICATIONS

Product Data Sheet for Precision Spheres for BGAs (PGBA, CBGA, and TBGA), Indium Corporation of America.

Product Data Sheet for NC–SMQ®80 Solder Paste, Indium Corporation of America.

Brochure for "Research Solder Kits", Indium Corporation of America.

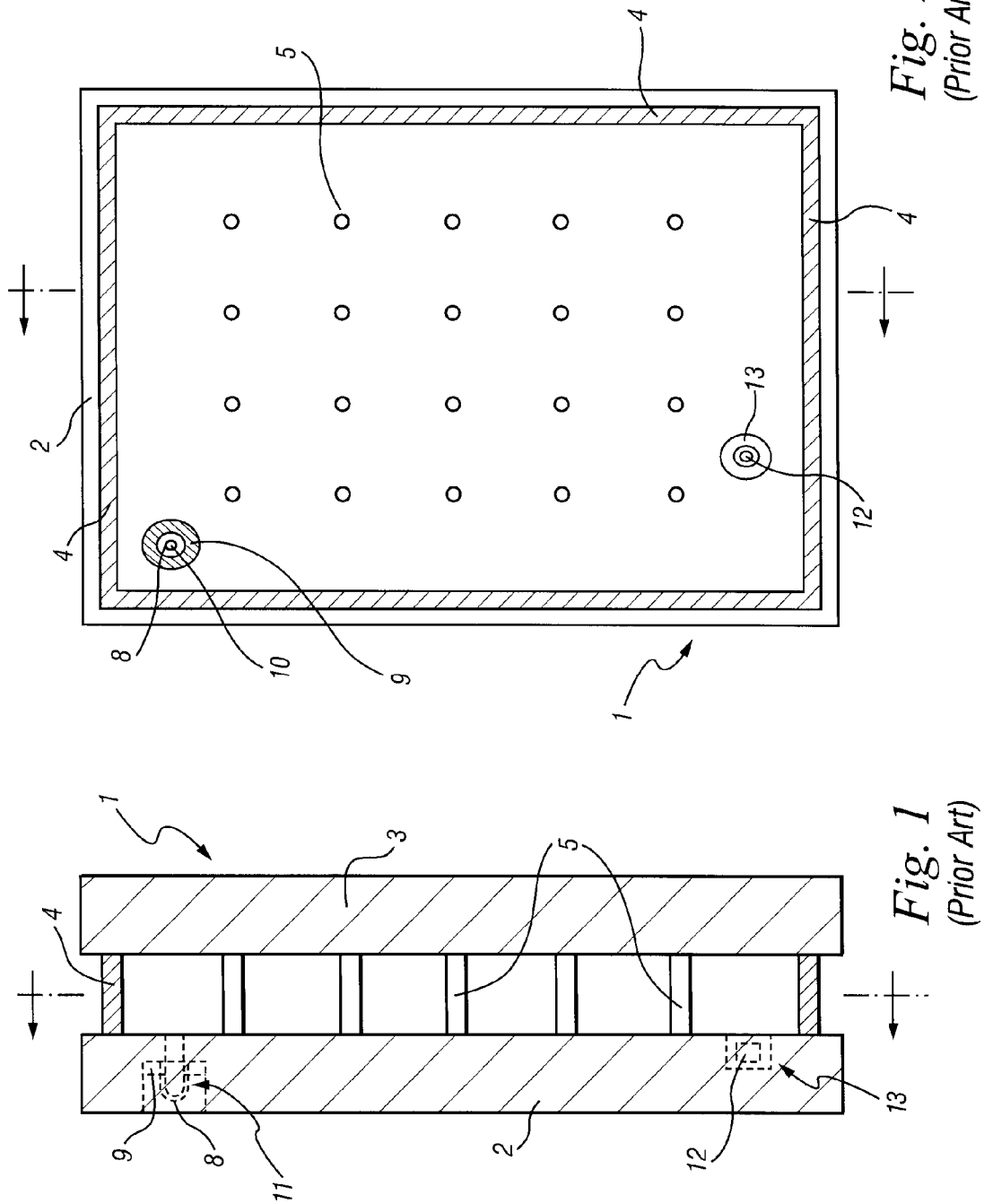

PERIPHERAL SEAL FOR VACUUM IG WINDOW UNIT

RELATED APPLICATION

Commonly owned U.S. Ser. No. 09/303,550, entitled "VACUUM IG PILLAR WITH DLC COATING" and filed May 3, 1999, now U.S. Pat. No. 6,326,067 is hereby incorporated herein by reference.

BACKGROUND OF THE INVENTION

Vacuum IG units are known in the art. For example, see U.S. Pat. Nos. 5,664,395 and 5,657,607, the disclosures of which are both hereby incorporated herein by reference.

Prior art FIGS. 1–2 illustrate a conventional vacuum IG unit. IG unit 1 includes two spaced apart sheets of glass 2 and 3 which enclose an evacuated or low pressure space therebetween. Glass sheets 2 and 3 are interconnected by peripheral seal of fused solder 4 and an array of support pillars 5.

Pump out tube 8 is hermetically sealed by fused solder glass 9 to an aperture or hole 10 which passes from an interior surface of glass sheet 2 to the bottom of recess 11 in the exterior face of sheet 2. Recess 11 allows pump out tube 8 to be melted and sealed leaving a stub which does not protrude beyond the plane of the exterior face of sheet 2. When sheets 2, 3 and peripheral/edge seal 4 are in place, prior to the tube being sealed, a vacuum is attached to pump out tube 8 so that the interior cavity between sheets 2 and 3 can be vacuumed out to create a low pressure area. Chemical getter 12 may optionally be included within a machined recess 13 in one of the glass sheets to counteract any rise in pressure due to out-gassing from the glass.

Conventional vacuum IG units, with their fused solder glass peripheral seals 4, have been manufactured as follows when the upper glass sheet is slightly smaller in dimension than the lower sheet (not shown in FIGS. 1–2). Solder glass is initially deposited around the periphery of the IG unit in an L-shaped corner that is formed by virtue of the upper sheet being slightly smaller in dimension than the lower sheet (not shown in FIGS. 1–2). The solder glass for seal 4 is originally deposited around the periphery of the unit. The entire assembly including sheets 2, 3 and the solder glass material is then heated to a temperature of approximately 500° C. at which the solder glass melts, wets the surfaces of the glass sheets, and flows by capillary action into the space between the sheets forming hermetic peripheral seal 4. This approximate 500 degree C. temperature is maintained for about an hour. After formation of edge seal 4 and of the seal around pump out tube 8, the assembly is cooled to room temperature.

As referenced above, high processing temperatures are required in the manufacture of conventional vacuum IG units. As mentioned in column 2 of the aforesaid '395 patent, the conventional vacuum IG processing temperature is approximately "500° C. for 1 hour." Inventor Collins of the '395 patent stated in "Thermal Outgassing of Vacuum Glazing", by M. Lenzen, G. M. Turner and R. E. Collins, that "The edge seal process is currently quite slow: Typically the temperature of the sample is increased at 200° C. per hour, and held for one hour at a constant value ranging between 430° C. and 530° C. depending on the solder glass composition."

Unfortunately, these high temperatures and long periods of time at which such high temperatures are maintained in forming edge seal 4 are undesirable, especially when it is desired to use a tempered glass sheet in the IG unit. Tempered glass loses temper strength upon exposure to high temperatures as shown in FIGS. 3–4. Moreover, these high temperatures may have an adverse effect upon certain low-E coating(s) that may be applied to one or both of the glass sheets.

In "Current Status of the Science and Technology of Vacuum Glazing", R. E. Collins and T. M. Simko, 1998, states that: "a low temperature process to make a hermetic edge seal would overcome this difficulty; despite significant efforts, however, such a process has yet to be shown to be viable."

FIG. 3 is a graph illustrating how fully thermally tempered plate glass loses original temper upon exposure to different temperatures for different periods of time, where the original center tension stress is 3,200 MU per inch. The X-axis in FIG. 3 is exponentially representative of time in hours (from 1 to 1,000 hours), while the Y-axis is indicative of the percentage (%) of original tempering strength remaining after exposure. FIG. 4 is a graph similar to FIG. 3, except that the X-axis extends from 0 to 1 hour exponentially in terms of time.

Seven different curves are illustrated in FIG. 3, each indicative of a different temperature exposure in degrees Fahrenheit (F.). The different temperature curves/lines are 400° F. (across the top of the FIG. 3 graph), 500° F., 600° F., 700° F., 800° F., 900° F., and 950° F. (at the bottom of the FIG. 3 graph). A temperature of 900° F. is equivalent to approximately 482° C., which is within the range utilized for forming the aforesaid conventional solder glass peripheral seal/joint 4. Thus, attention is drawn to the 900° F. curve in FIG. 3, which is labeled by reference numeral 18. As shown, only 20% of the original temper remains after one hour at this temperature (900° F. or 482° C.). Such a loss of temper strength may result in certain window units not being able to pass safety codes set for environments where tempered glass is desirable. Thus, if thermally tempered glass sheets are to be used in an IG unit, it is undesirable to have to heat the unit to the processing temperatures required for conventional vacuum IG units having solder glass peripheral seals 4.

"Fabrication of Evacuated Glazing at Low Temperature", by Griffiths, et al., discloses the provision of an indium wire around the edge of a vacuum IG unit for sealing purposes. Unfortunately, Griffiths, et. al. do not address detempering problems. A further disadvantage of Griffiths et. al. is that their provision of the indium seal in the form of a wire allows for substantial oxidation to occur which is disadvantageous in some applications.

It is apparent from the above, that there exists a need in the art for a vacuum IG unit, and corresponding method for making the same, where a hermetic seal may be provided between opposing glass sheets without having to heat the IG unit to the high processing temperatures (e.g. approximately 500° C.) referenced above, thereby allowing thermally tempered glass to be used in vacuum IG units without losing substantial temper during the manufacturing process. This would also allow certain temperature sensitive low-E coatings to be utilized. There exists a further need in the art to provide an indium edge seal in a vacuum IG unit in a manner so that oxidation is minimized.

This invention will now be described with respect to certain embodiments thereof, accompanied by certain illustrations.

SUMMARY OF THE INVENTION

An object of this invention is to provide an edge seal for a vacuum IG unit, wherein the edge seal does not require processing temperatures greater than about 200 degrees C.

Another object of this invention is to provide an indium-inclusive edge seal for a vacuum IG window unit.

Another object of this invention is to provide a vacuum IG window unit having thermally tempered glass sheets, wherein processing temperatures utilized during manufacture of the IG unit allow the glass sheets to retain at least about 70% of their original tempering strength after the unit has been made, or after a seal-forming heating step has been completed.

Generally speaking, this invention fulfills the above described needs in the art by providing a method of making a thermally insulating glass product, the method comprising the steps of:

thermally tempering first and second glass substrates so that each substrate has an original tempering strength immediately after said tempering;

providing a sealing material between the first and second thermally tempered glass substrates;

heating the sealing material so that the sealing material bonds between the first and second substrates and forms a hermetic seal defining a low pressure space between the substrates;

and wherein the heating step includes heating the thermally tempered glass substrates to a temperature low enough and for a time short enough so that the first and second substrates retain at least about 70% of their original tempering strength after the heating step is completed.

In certain embodiments, the heating step includes heating the sealing material and the glass substrates to a maximum temperature of less than or equal to about 300 degrees C., most preferably to a maximum temperature of less than or equal to about 200° C.

This invention further fulfills the above described needs in the art by providing a thermally insulating glass panel comprising:

first and second spaced apart thermally tempered glass substrates enclosing or defining a space therebetween;

an indium inclusive peripheral seal interconnecting the first and second spaced apart glass substrates so as to hermetically seal the space between the substrates; and wherein the first and second glass substrates retain at least about 80% of their original tempering strength at a point in time after the peripheral seal is formed.

This invention further fulfills the above described needs in the art by providing an insulating glass (IG) window unit comprising:

first and second glass substrates spaced from one another so as to define a low pressure space therebetween, the low pressure space having a pressure less than atmospheric pressure so as to improve thermal insulating characteristics of the window unit;

at least one groove or notch defined in at least one of the glass substrates proximate an edge thereof;

a hermetic seal disposed between the substrates hermetically sealing the low pressure space from surrounding atmosphere so as to maintain pressure less than atmospheric pressure in the space, and sealing material forming the hermetic seal being at least partially located within the groove or notch.

In certain embodiments, the flexible hermetic seal has an elongation coefficient of at least about 10% so that the seal can stretch in a direction at least about 10% of its original size without losing its hermetic sealing function.

IN THE DRAWINGS

FIG. 1 is a prior art cross-sectional view of a conventional vacuum IG unit.

FIG. 2 is a prior art top plan view of the FIG. 1 vacuum IG unit, taken along the section line illustrated in FIG. 1.

DETAILED DESCRIPTION OF CERTAIN EMBODIMENTS OF THIS INVENTION

Figure 3:
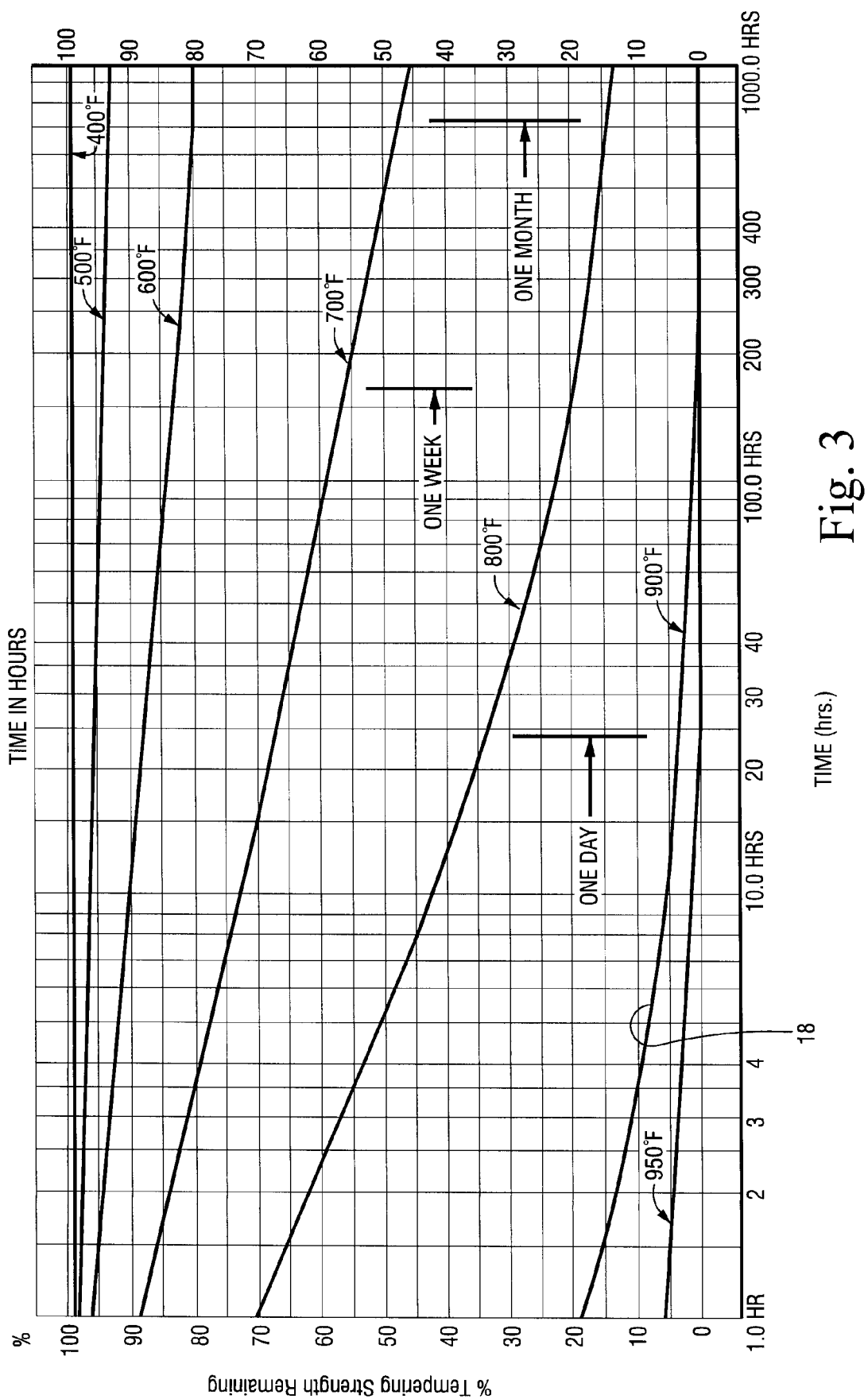
FIG. 3 is a known time (hours) vs. percent tempering strength remaining graph, illustrating the loss of original temper strength for a tempered plate of glass after exposure to different temperatures for different periods of time.
Figure 4:
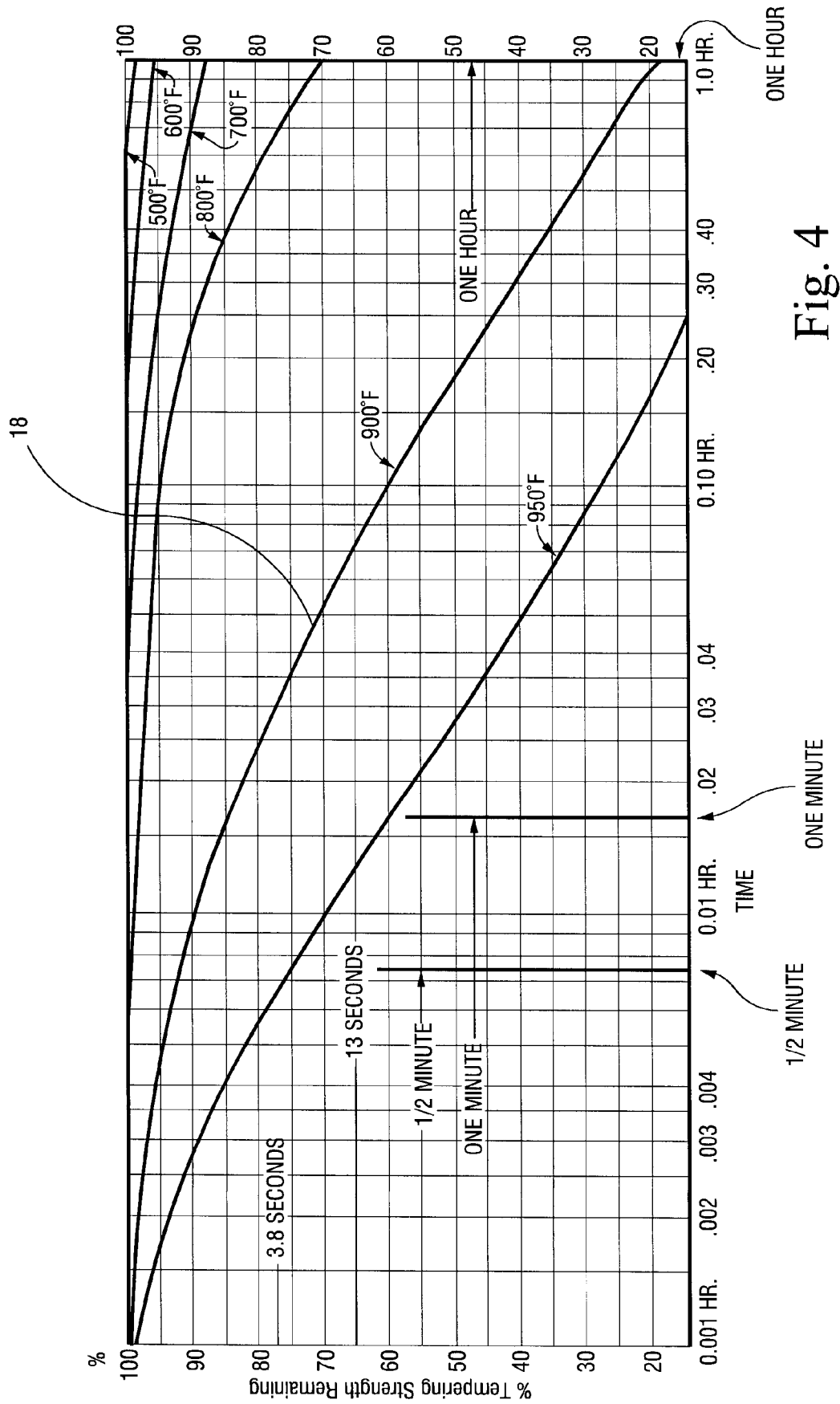
FIG. 4 is a known time vs. percent tempering strength remaining graph, illustrating the loss of original temper strength for a tempered sheet of glass after exposure to different temperatures for different periods of time.

Referring now more particularly to the accompanying drawings in which like reference numerals indicate like parts throughout the several views.

Certain embodiments of this invention relate to an improved peripheral or edge seal 43 in a vacuum IG window unit, and a method of making the same.

Figure 5:
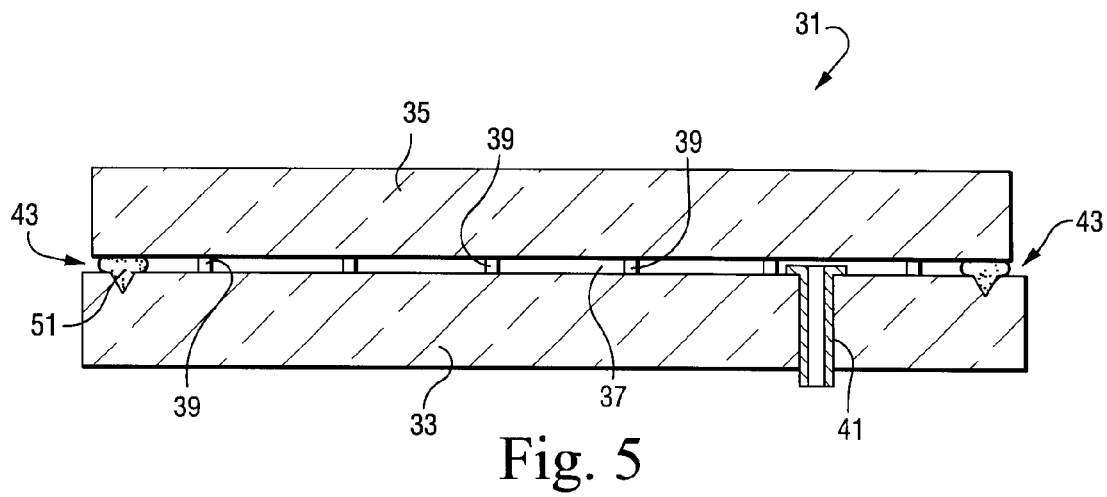
FIG. 5 is a side cross-sectional view of a vacuum IG unit according to an embodiment of this invention.

FIG. 5 is a cross sectional view of thermally insulating glass panel 31 according to an embodiment of this invention. Because space 37 between the opposing substrates is at a pressure lower than atmospheric in general, this type of panel is often referred to as a vacuum insulating glass (IG) unit.

Vacuum IG unit or panel 31 includes first glass substrate 33, second glass substrate 35, low pressure or evacuated space 37 between substrates 33 and 35, pillars 39 for spacing the substrates 33, 35 from one another and supporting them, optional pump out tube 41 disposed in a hole or aperture formed in substrate 33 for evacuating space 37, and peripheral or edge seal 43, 51 that hermetically seals low pressure space or cavity 37 between substrates 33, 35. Hermetic edge seal 51 prevents air from entering space 37 and keeps the vacuum therein. Seal 43, 51 is located in approximately the same peripheral location as seal 4 shown in FIG. 2. Reference numerals 43 and/or 51 may be used herein to refer to this peripheral or edge seal.

IG units 31 according to different embodiments of this invention may be used as residential or commercial windows. The evacuation of space 37 eliminates heat transport between glass substrates 33 and 35 due to gaseous conduction and convection. In addition, radiative heat transport between glass sheets 33 and 35 can be reduced to a low level by providing a low emittance (low-E) coating(s) on the internal surface of one or both of sheets 33, 35. High levels of thermal insulation can thus be achieved. Low gaseous thermal conduction may be achieved when the pressure in space 37 is reduced to a level below about $10^{-2}$ Torr, more preferably below about 1.0 mTorr, or $10^{-3}$ Torr, and most preferably below about $10^{-6}$ Torr of atmospheric pressure. To maintain such low pressures, the internal surfaces of glass substrates 33 and 35 may be outgassed, and areas near the edges or peripheries of substrates 33, 35 are hermetically sealed together by seal 43, 51 that eliminates any ingress or gas or air.

An array of small, high strength support pillars 39 is provided between substrates 33 and 35 in order to maintain separation of the two approximately parallel glass sheets against atmospheric pressure. Pillars 39 result in stress concentrations in the glass and provide thermal contact between sheets 33, 35, thereby decreasing thermal insulation of the unit. It is desirable for pillars 39 to be sufficiently small so that they are visibly unobtrusive. In certain embodiments, each pillar may have a height of from about 0.10 to 0.30 mm.

In certain preferred embodiments of this invention, glass sheets 33 and 35 are thermally or heat tempered. By providing tempered glass sheets as substrates 33 and 35, the strength of the glass sheets is increased. This allows pillars to be spaced further apart, thereby resulting is less pillars being utilized in the vacuum IG unit. Reduction in the number of pillars increases the thermal insulation properties of vacuum IG unit 31.

Tempered glass 33 and/or 35 is valued for its mechanical and thermal strength. Tempered glass has been used traditionally in commercial applications where wind, snow or thermal loads exceed the strength capabilities of other glass and/or where tempered glass is mandated by code (e.g. safety glazing for entranceways, railings, or fire knockout windows). Glass substrates 33 and/or 35 may be tempered in heated furnaces which heat the glass to a uniform temperature of approximately 1200 degrees F. (e.g. from about 1100–1400 degrees F.). When the glass 33, 35 exits the tempering furnace, it is rapidly cooled by a series of air nozzles. This rapid cooling puts approximately 20% of the glass surface into a state of compression, with the center core in tension. Tempered glass gains strength from the compressed surfaces. However, if the surface is penetrated by a scratch or an impact, the glass may break into a number of small particles. In certain embodiments of this invention, when substrates 33 and/or 35 are heat tempered, they may have up to approximately four times the mechanical and thermal strength of annealed glass of equal thickness. Break patterns of tempered glass herein are typically governed by and comply with Consumers Product Safety Commission 16 CFR 1202 and ANSI Z-97.1, both incorporated herein by reference. It is noted that when tempered glass is used herein, optional holes may be drilled or otherwise formed in the substrate (33 or 35) for the optional pump out tube before the substrate is thermally tempered.

According to certain embodiments of this invention, the glass used for substrates 33 and 35 is soda lime silica glass, comprising by weight 70–74% silicon oxide, 12–16% by weight sodium oxide, 7–12% lime (CaO), 0–5% MgO, 0–5% alumina, and 0–0.20% iron oxide. However, other types of glass, colored or clear, may also be used (e.g. borosilicate glass). These glasses 33, 35 may be (i) thermally tempered, (ii) chemically tempered, or (iii) not tempered, according to different embodiments of this invention. However, in certain preferred embodiments, one or both of sheets 33, 35 is/are thermally tempered. Glass sheets 33 and/or 35 may be from about 1 to 4.5 mm thick each, preferably from about 2–3 mm thick each. However, when tempered, thinner glass sheets 33, 35 may be used (e.g. from about 1 to 3 mm thick, more preferably from about 1.7 to 2.3 mm thick). The use of thinner glass substrates 33, 35 provides for improved thermal behavior (e.g. reduced edge conduction).

Figure 6:
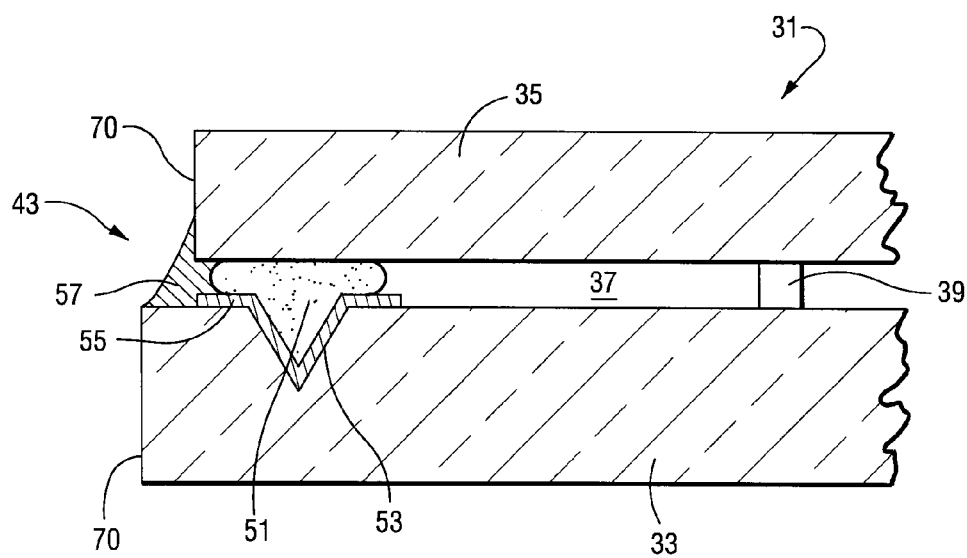
FIG. 6 is a close-up side cross-sectional view of the peripheral seal of an embodiment of this invention.

FIG. 6 is a close-up side cross sectional view of a seal area of a vacuum IG unit according to an embodiment of this invention. Seal 43 includes hermetic sealing material 51, groove or notch 53 formed in substrate 33, optional conductive coating 55 provided in the area where hermetic seal material 51 is adapted to be placed, and optional hermetic or non-hermetic outer mechanical seal 57.

Figure 7:
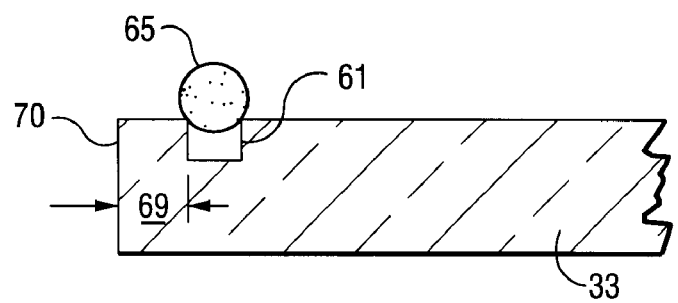
FIG. 7 is a side cross-sectional view of a glass sheet for use in a vacuum IG unit according to any of the embodiments of this invention discussed herein.
Figure 8:
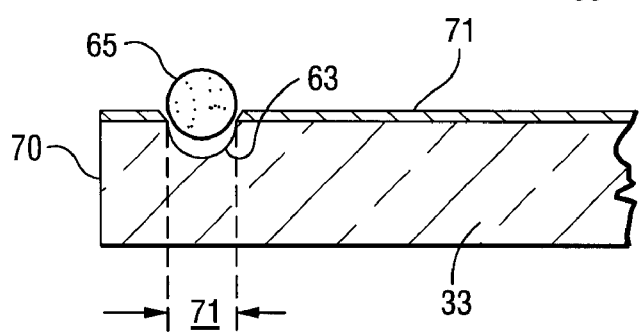
FIG. 8 is a cross-sectional view of a glass sheet for use in a vacuum IG unit according to any of the embodiments of this invention discussed herein.

Groove or notch 53 is V-shaped as shown in FIGS. 5–6, but alternatively may be rectangular or square 61 as shown in FIG. 7 or circular or arcuate 63 as shown in FIG. 8. Each of these shapes 53, 61 and 63 is referred to herein as either a notch, groove, cut-out, or detent. A purpose of continuous grooves 53, 61 and 63 is to provide a place for initially locating hermetic seal material (e.g. preferably in slurry or paste form, but optionally in wire form as shown in FIGS. 7–8) prior to the formation of seal 51. These grooves, when viewed from above, may be formed around the entire edge of the substrate where element 4 is located in FIG. 2.

Figure 11:
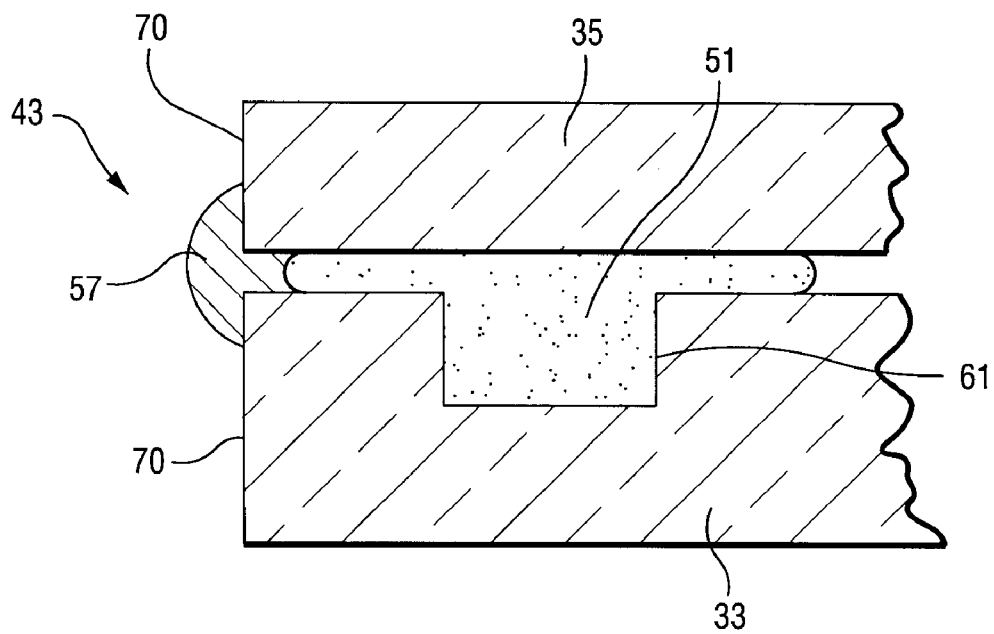
FIG. 11 is a cross-sectional view of a peripheral seal in a vacuum IG unit according to another embodiment of this invention.

The sealing material is preferably deposited into the edge groove or notch in the form of a paste (or is slurry) to minimize oxidation. Such a slurry may include, for example, an organic solvent and binder as well as a powder including Indium. The slurry may be deposited into the groove(s) from the syringe in slurry or semi-liquid form. The viscous slurry remains mostly in the groove(s) because it is not purely liquid and contains solid particles. However, some of the slurry protrudes outwardly from the groove above the plane of sheet 33 as shown in FIGS. 5, 6 and 11 so that when the other sheet 35 is pressed against it, the heated slurry deforms and hermetic seal 51 is formed and space 37 defined. The slurry application properly wets to the glass and results in an efficient hermetic seal 51.

In certain embodiments of this invention, the hermetic sealing material to be deposited in the groove may be obtained from Indium Corp. Of America, Utica, N.Y. For example, Indalloy Number 53 available from Indium Corp. in paste form has a composition of 67% Bi and 33% In (% by weight). Indalloy Number 1 available from Indium Corp. in paste form has a composition of 50% In and 50% Sn. Indalloy Number 290 available from Indium Corp. in paste form has a composition of 97% In and 3% Ag. Indalloy Number 9 available from Indium Corp. in paste form has a composition of 70% Sn, 18% Pb and 12% In. Indalloy Number 281 available from Indium Corp. in paste form has a composition of 58% Bi and 42% Sn. Indalloy Number 206 available from Indium Corp. in paste form has a composition of 60% Pb and 40% In. Indalloy Number 227 available from Indium Corp. in paste or wire form has a composition of 77.2% Sn, 20% In and 2.8% Ag. Indalloy Number 2 available from Indium Corp. in paste or wire form has a composition of 80% In, 15% Pb and 5% Ag. Indalloy Number 4 available from Indium Corp. in paste or wire form has a composition of 100% In. Indalloy Number 205 available from Indium Corp. in paste or wire form has a composition of 60% In and 40% Pb. Indalloy Number 3 available from Indium Corp. in paste or wire form has a composition of 90% In and 10% Ag. Each of the above hermetic sealing material alloys for seal 51, in paste form, has a particle size of from about 25–44 microns. Pastes (or slurries) may be provided or packaged in syringes with thumb plungers.

Indium containing alloys allow for improved ductility to compensate for thermal coefficient of expansion differences between, e.g., the glass and layer 55, and may be formed using low temperatures discussed herein. Material 51 herein typically has a tensile strength of less than about 6800 PSI, and a thermal coefficient of expansion of from about 15–30, preferably from about 20–30 PPM/° C. @ 85° C. In certain preferred embodiments, each of the aforesaid sealing materials may be deposited into a groove(s) along with a solvent so as to form a slurry or paste in and around the groove. The solvent is typically a volatile or semi-volatile component of the paste flux/vehicle (available from Indium Corp.) which evaporates during the drying of the sealing material slurry. Seal 51 is left after the solvent evaporates. The flux/vehicle (also available from Indium Corp.) applied with any of the aforesaid pastes/powders provides the fluxing and rheological characteristics of the slurry. The flux/vehicle includes, in certain exemplar embodiments, rosin(s)/resin(s), activator (s) if necessary, thixotropic/rheology agent(s), and the solvent system. The rosin/resin is a solids portion of the flux/vehicle including gum rosin, processed resin, and a heat stabilized resin in certain embodiments, these materials providing fluxing activity and body to solder paste as obtainable from Indium Corp.

After substrates 33, 35 are brought together, the slurry of sealing material provided in groove/notch 53, 61, 63 is heated along with the glass substrates 33, 35 so that the sealing material deforms into the continuous hermetic seal 51 illustrated in FIGS. 5, 6, 9, 10 and/or 11 and becomes bonded or adhered to the substrates 33, 35 as shown in these figures. In certain embodiments, one or both of substrates 33, 35 may be pressed against the other during the heating and deformation of the sealing material.

Although preferably deposited in slurry form to minimize oxidation, the sealing material may instead be laid down in wire 65 form as shown in FIGS. 7–8, or alternatively may be web-shaped, flat, triangular, oval, irregular, rectangular, or the like, when it is laid down in different embodiments. When circular, wire 65 may have a diameter of from about 0.25 to 3.0 mm, more preferably from about 0.5 to 0.6 mm.

Grooves 53, 61 and/or 63 may have a top width coplanar with the substrate surface of from about 0.25 to 3.0 mm, preferably about 0.5 mm (i.e. smaller than the diameter of wire 65). In preferred embodiments, groove 53, 61 and/or 63 may be formed in substrate 33 so that the cut-out or drop off from the interior surface of the substrate begins from about 2 to 15 mm inwardly of edge 70 of substrate 33 (i.e. distance 69 in FIG. 7 may be from about 2 to 15 mm). Groove 53, 61 and/or 63 may be formed in certain embodiments so that its width 71 (e.g. see FIG. 8) is preferably from about 0.4 to 1.0 mm, most preferably about 0.5 mm.

Figure 10:
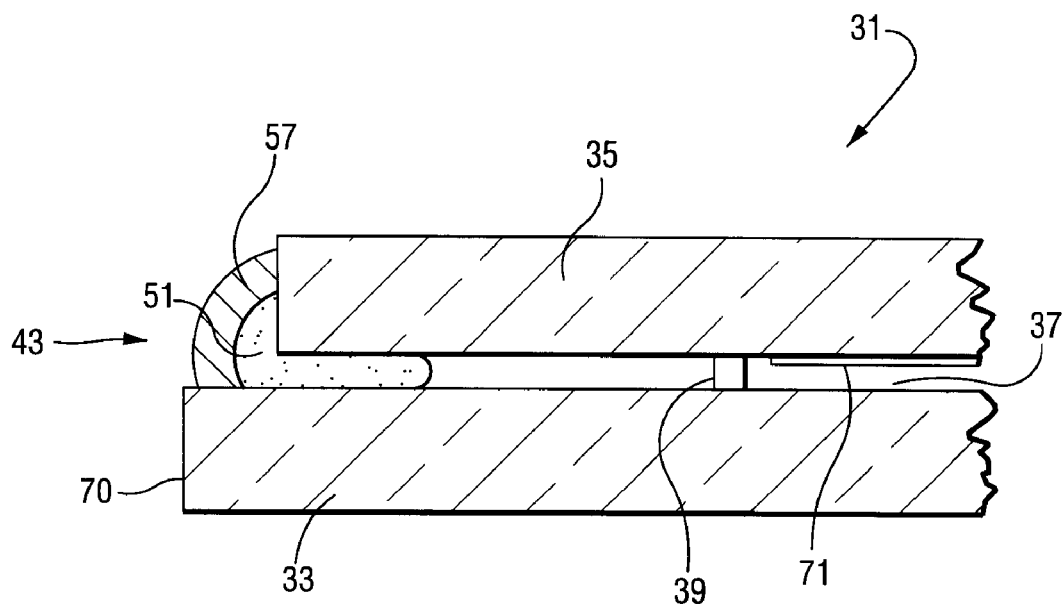
FIG. 10 is a cross-sectional view of a peripheral seal in a vacuum IG unit according to still another embodiment of this invention.

In certain embodiments, bottom substrate 33 is larger in area than top substrate 35 (or vice versa) so that edges 70 of the substrates do not line up with one another. This causes an L-shaped area to be formed by the interior surface of substrate 33 and edge 70 of substrate 35, with the bottom of the "L" being the interior surface of substrate 33. Optional mechanical seal 57 which reinforces and/or protects hermetic seal 51 may be provided in this L-shaped area as shown in FIGS. 6 and 10. However, in other embodiments, substrates 33 and 35 may be the same size as shown in FIG. 11 so that edges 70 thereof approximately line up with one another.

Hermetic seal material 51 in some embodiments preferably includes at least about 20% by weight indium, more preferably at least about 50%, and most preferably at least about 80% indium. In certain embodiments, seal material 51 includes at least about 50% indium, at least about 5% silver, and at least about 10% lead. Seal 51 is of a material so that an initial flexible or viscous slurry or wire may be provided between the substrates, which is thereafter deformed and creates hermetic peripheral seal 51 upon exposure to mechanical pressure between the substrates and temperatures of from about 100–300 degrees C., most preferably temperatures of from about 100–200 degrees C. The melting temperature of material 51 is preferably less than about 250 degrees C., most preferably less than about 200 degrees C., and most preferably less than about 150° C. The material 51 may be exposed to these temperatures in certain preferred embodiments for a time less than about twenty minutes. In alternative embodiments, hermetic seal 51 may include or be made of gold, platinum, combinations thereof, or other adequate materials.

Material 51 has characteristics in that it sticks to itself (self adhesion), can handle high thermal stresses, can provide a hermetic seal between the substrates, and is highly ductile or flexible. Because of the flexibility of material 51 (contrary to the prior art fused solder glass peripheral seal which is rigid), there is no need to match the coefficient of expansion of material 51 to that of the glass substrates. The thermal coefficient of expansion of material 51 may thus be different from that of glass by at least about 5%, preferably by at least about 10% in certain embodiments of this invention. The hermetic seal material 51 has a hardness (Brinell scale) less than about 5.0, preferably from about 0.5 to 2.0, more preferably from about 0.8 to 1.0, and most preferably about 0.8. Conventional fused solder glass edge seals have a hardness much higher than the hardness of material 51. Seal 51 also has an elongation of at least about 10%, preferably from about 15–30%, more preferably from about 20–25%, and most preferably about 22% (i.e. how far it will stretch).

Figure 9:
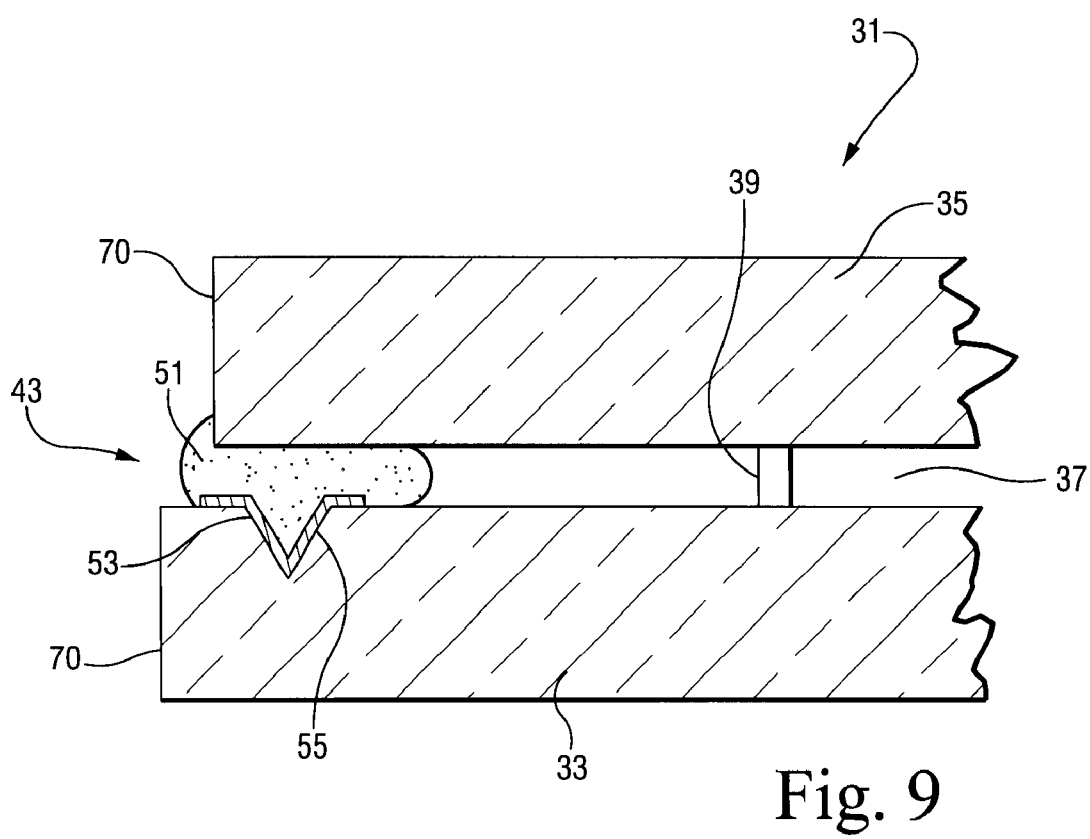
FIG. 9 is a cross-sectional view of a peripheral seal for a vacuum IG unit according to another embodiment of this invention.

Referring to FIGS. 6 and 9, optional coating(s) 55 is provided over at least groove 53, 61 and/or 63 so as to allow seal material 51 to better adhere to substrate 33. For example, coating 55 may be made of or include copper, chromium, silver, indium, ITO (indium tin oxide), or any combination thereof in different embodiments. When coating 55 includes or is made of copper for example, the heated indium in material 51 when pressed against or in contact with copper coating 55 forms a copper-indium alloy that provides for a rigid seal at the interface between hermetic seal material 51 and coating 55. When coating 55 is of ITO, the indium in material 51 grows well thereon and adheres well to it. A similar coating may optionally be provided in the peripheral seal area on the other substrate 35 as well. Indium adheres better to these coating 55 materials than to glass 33. In certain embodiments, coating 55 may be from about 100 Å to 2.5 μm thick, more preferably from about 250 to 500 Å thick, and most preferably about 300 Å thick.

In addition to being provided in the area of the groove, coating 55 may also extend outwardly in one or both directions from the groove by from about 1 to 3 mm in different embodiments of this invention to provide added support and adherence capabilities for the hermetic seal material.

Protective mechanical seal 57 (e.g. made of or including butyl) may optionally be provided around IG unit 31 in certain embodiments. Because hermetic peripheral seal 51 does not have great mechanical strength in some embodiments, stronger mechanical seal 57 may be formed therearound for protection purposes as well as to help bond the substrates together. Seal 57 also protects the unit 31 interior and seal 51 from acids, water and other environmental hazards.

FIGS. 5–6 illustrate hermetic edge and peripheral seal 51 being entirely located slightly inward of edges 70 of substrates 33 and 35. Meanwhile, protective mechanical seal 57 is located partially inward of edge 70 of substrate 35 and partially outward of that edge 70. Referring to the FIG. 9 embodiment however, it is noted that (i) second seal 57 is not needed in all embodiments, and/or (ii) hermetic seal 51 may be provided both immediately between the opposing substrates 33, 35 as well as at least partly outwardly of the edge 70 of one or both of the substrates. It is even possible to place the sealing material 51 (e.g. preferably slurry) initially partially outward of edge 70 of substrate 35 prior to heating the same, although it is preferred to initially position the sealing material in a groove 53 of a substrate.

Unlike the FIG. 5–9 embodiments, the FIG. 10 embodiment illustrates that vacuum IG unit 31 may be made without utilizing a groove, notch, or cut out for initial positioning of the sealing material. In this embodiment, slurry or wire 65 may initially be positioned in the L-shaped area previously mentioned (or simply between the opposing substrates) before the unit is heated and the material deformed to form hermetic seal 51. Seal 51 may seep or flow into the space between the opposing substrates during its deformation to create the seal, or it may be mechanically forced into that space in an appropriate manner. Optionally, secondary mechanical seal 57 may then be applied outside of hermetic seal 51.

FIG. 11 is a cross sectional view of hermetic edge seal 51 after the seal material is deformed to form the edge seal. Groove 61 may be coated 55 or uncoated in different embodiments. In this embodiment, glass sheets 33, 35 are approximately the same size so that edges 70 thereof approximately line up with one another. Secondary protective seal 57 is optional. FIG. 11 illustrates how the slurry or wire seal material is flattened into hermetic seal 51 when one substrate (e.g. 35) is pressed toward the other thereby applying mechanical pressure to the heated seal material. The degree to which the material is flattened is a function of how hard and/or how long the substrate(s) are pressed toward one another and the heat being applied.

For purposes of example only, without limitation, certain steps of an exemplary procedure for making a vacuum IG unit 31 according to an embodiment of this invention are described below. To begin, substrates 33 and 35 are provided (e.g. float glass). The substrates may be thermally tempered as described above to provide an original tempering strength. A diamond bit scriber is used and manipulated around an outer peripheral area of substrate 33 to form continuous peripheral groove 53 (or groove 61, 63). This groove is termed a "peripheral" groove because it is near or proximate the periphery of substrate 33, and it need not be on the absolute edge 70.

After groove 53 is formed, coating 55 is deposited and formed on substrate 33 over groove 53 so as to extend outwardly from the edges of the groove. Pillars 39 (e.g. of ceramic and/or solder glass) are deposited on the interior surface of substrate 33. A slurry of indium inclusive material is then placed so as to be at least partially within groove 53 (i.e. at least the bottom portion of the material is in the groove while a substantial portion of the material protrudes upwardly from the groove above the plane of the glass sheet) in the area where the hermetic seal is to be formed. Groove 53, 61, 63 maintains the material in place and keeps it from moving laterally to any great extent. Upper substrate 35 is then laid over and placed on bottom substrate 33 with the seal material either solely or partly maintaining spacing between the substrates. The seal material may stick up above the surface of substrate 33 from about 0.15 to 0.5 mm, preferably from about 0.25 to 0.35 mm. The upper sheet is then pressed down toward the lower sheet 33 (or vice versa, or both pressed together).

If a pump out tube is to be used to evacuate space 37, then the unit (e.g. including the two substrates, pillars, and seal material therebetween) is heated to a temperature of about 100–300 degrees C. for up to one hour to degas the glass substrates and deform the seal material to form hermetic seal 51.

However, in. more preferred embodiments, the pump out tube may be eliminated. In such embodiments, each substrate 33, 35 (one grooved) is placed in a degassing chamber prior to the seal material being laid down and prior to being placed on one anther. This chamber is heated to from about 100–300 degrees C., preferably from about 125 to 300C., for about 30–90 minutes to get water vapor out of the glass substrates. Then, the glass substrates are taken to a vacuum chamber having a pressure desired to be the final pressure in space 37. In this vacuum chamber, sealing material is laid down or deposited as are pillars 39 on substrate 33, and the upper substrate 35 is then laid on the lower one 33 with the pillars and slurry material therebetween. The temperature in the vacuum chamber is set to less than about 300° C. for the slurry deformation, preferably less than or equal to about 200° C. and most preferably less than or equal to about 150° C. In certain embodiments, the temperature in this vacuum chamber is from about 100–280 degrees C., preferably from about 140 to 200C., so that when the top substrate 35 is pressed downward toward the lower substrate (or vice versa) the slurry or wire deforms (e.g. flattens or partially flattens) between the substrates at this temperature into the hermetic seal shown in any of FIGS. 5, 6, 9, 10 or 11 and bonds to the substrates. After this pressing, there is no need for further baking because the substrates had previously been degassed. Thus, these hermetic seal forming temperatures in the vacuum chamber need only be maintained for less than about 20 minutes, more preferably for less than about 5 minutes and most preferably less than about 2 minutes and potentially less time than that. The pressing (i.e. moving or maintaining mechanical force on one or more substrates) of at least one of the substrates toward the other to deform the sealing material may last from about 5 to 120 seconds, more preferably from about 10–60 seconds. It is noted that certain de-gassing temperatures in the process may or many not exceed 300° C.

It is noted that it is desirable to not heat the unit to a temperature where the sealing material will melt or liquify completely, but instead to heat it to a temperature where the material softened can be deformed into hermetic seal 51 and adhere to the opposing substrates as illustrated in any and/or all of the different embodiments.

Afterwards, the vacuum IG unit with hermetic seal 51 around the periphery thereof is taken out of the evacuated oven area and allowed to cool in the atmospheric area. Optionally, before being taken to an atmospheric area, the center of the glazing may be blasted with room temperature air from both sides to cool the center faster than edge areas. The process of manufacture set forth above, utilizing the indium inclusive hermetic seal, enables the thermally tempered glass sheets 33, 35 to retain at least about 70% of their original temper strength, more preferably at least about 80% of their original temper strength, and most preferably at least about 90% of their original temper strength through and after the manufacturing process is completed.

Another advantage associated with the instant invention is that edge deletion of low-E coating(s) on substrates 33 and/or 35 for seal 51 adhesion purposes may no longer be necessary for some coatings. As discussed above, a low-E coating 71 (e.g. see FIGS. 8 and 10) may be applied to the interior surface of one or both of glazings 33, 35. Seal 51 may not adequately adhere to certain such coatings 71. When the groove is formed in a substrate having a low-E coating 71 thereon, the forming of groove 53, 61, 63 removes the low-E coating in the area of the groove (e.g. see FIG. 8). Thus, there is no need for a separate step of removing the low-E coating where the hermetic seal is to be placed, as the groove 53, 61, 63 forming step exposes the glass of the substrate and achieves this function.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A thermally insulating glass panel comprising:

first and second spaced apart thermally tempered glass substrates defining a low pressure space therebetween;

an indium inclusive peripheral seal interconnecting said first and second spaced apart glass substrates so as to hermetically seal said low pressure space between said substrates; and wherein said first and second glass substrates retain at least about 70% of their original tempering strength at a point in time after said peripheral seal is formed between said substrates.

2. The thermally insulating glass panel of claim 1, wherein said first and second substrates are soda lime silica glass substrates, and are substantially parallel to one another.

3. The thermally insulating glass panel of claim 1, wherein said peripheral seal includes, by weight, at least about 20% indium (In).

4. The thermally insulating glass panel of claim 3, wherein said peripheral seal includes, by weight, at least about 50% indium, and wherein material forming said peripheral seal is originally deposited on one of said substrates in a slurry including a solvent mixed with indium inclusive powder.

5. The thermally insulating glass panel of claim 4, wherein said peripheral seal includes, by weight, at least about 80% indium.

6. The thermally insulating glass panel of claim 1, wherein said peripheral seal includes indium, silver, and lead.

7. The thermally insulating glass panel of claim 6, wherein said peripheral seal includes at least about 50% indium, at least about 5% silver, and at least about 10% lead.

8. The thermally insulating glass panel of claim 1, wherein said peripheral seal includes an indium inclusive member which creates said hermetically sealed peripheral seal upon exposure to temperatures of from about 100–300 degrees C. and deformation of said member when exposed to said temperatures and mechanical pressure between said substrates.

9. The thermally insulating glass panel of claim 8, wherein said peripheral seal includes an indium inclusive slurry which creates said hermetically sealed peripheral seal upon exposure to temperatures of from about 100–200 degrees C., and wherein said panel further includes a coating from about 100 Å to 2.5 $\mu$m thick provided on said first substrate so that said coating is located at least in part between said first substrate and said peripheral seal.

10. The thermally insulating glass panel of claim 1, wherein the melting temperature of said peripheral seal is less than about 250 degrees C., and wherein said substrates retain at least about 80% of their original tempering strength at said point in time after said peripheral seal has been formed.

11. The thermally insulating glass panel of claim 10, wherein the melting temperature of said peripheral seal is less than about 150 degrees C., wherein said peripheral seal has an elongation of at least about 10% at room temperature, and wherein a groove is defined in said first substrate and said hermetic peripheral seal is at least partially located between said substrates in an area of said groove.

12. A thermally insulating glass panel comprising:

first and second spaced apart thermally tempered glass substrates defining a space therebetween;

a peripheral or edge seal interconnecting said first and second spaced apart glass substrates so as to hermetically seal said space between said substrates; and wherein said first and second glass substrates retain at least about 70% of their original tempering strength at a point in time after said peripheral seal is formed between said substrates.

* * * * *